US012320382B2

(12) United States Patent
Vippach et al.

(10) Patent No.: US 12,320,382 B2
(45) Date of Patent: Jun. 3, 2025

(54) DAMPING ELEMENT HAVING BAYONET CLOSURE

(71) Applicant: NIDEC GPM GMBH, Merbelsrod (DE)

(72) Inventors: Michael Vippach, Nahetal-Waldau (DE); Maik Büttner, Lautertal (DE)

(73) Assignee: NIDEC GPM GMBH, Merbelsrod (DE)

( * ) Notice: Subject to any disclaimer, the term of this patent is extended or adjusted under 35 U.S.C. 154(b) by 640 days.

(21) Appl. No.: 17/267,277

(22) PCT Filed: Aug. 16, 2019

(86) PCT No.: PCT/EP2019/072022
§ 371 (c)(1),
(2) Date: Feb. 9, 2021

(87) PCT Pub. No.: WO2020/035597
PCT Pub. Date: Feb. 20, 2020

(65) Prior Publication Data
US 2021/0310505 A1  Oct. 7, 2021

(30) Foreign Application Priority Data
Aug. 17, 2018 (DE) .......................... 102018120105.2

(51) Int. Cl.
*F16F 7/00* (2006.01)
*F16B 5/02* (2006.01)
(Continued)

(52) U.S. Cl.
CPC .............. *F16B 5/0241* (2013.01); *F16B 5/10* (2013.01); *F16F 1/3732* (2013.01); *F16F 1/376* (2013.01); *F16F 1/377* (2013.01)

(58) Field of Classification Search
CPC ........ F16F 1/3732; F16F 1/3735; F16F 1/377; F16F 1/376; F16B 5/10; F16B 5/0241; F16B 21/04; B60T 8/3685
See application file for complete search history.

(56) References Cited

U.S. PATENT DOCUMENTS 3,765,464 A * 10/1973 Hasegawa ............. F16B 37/044
411/965
3,874,752 A * 4/1975 Imazaike ................ F16C 33/20
384/296

(Continued)

FOREIGN PATENT DOCUMENTS

CN    104736879 A    6/2015
DE    10048889 A1    4/2002
(Continued)

*Primary Examiner* — Nicholas J Lane
(74) *Attorney, Agent, or Firm* — WCF IP

(57) ABSTRACT

A damping element (1) has grooves (5) on its circumferential surface in the manner of a bayonet closure. The grooves (5) are open towards an end face (2, 3) of the damping element (1), wherein the grooves (5) or at least first portions (8) of the grooves (5) open towards the end face (2, 3) of the damping element (1) run substantially in the longitudinal direction of the damping element (1). Moreover, the grooves (5) have narrow points (10). Projections (11) in a recess (13) in a first body (12) can engage in the grooves (5) in order to secure the damping element (1) in the first body (12). By means of the bayonet closure, the damping element (1) can be fastened to the first body (12) and separated therefrom again with little effort. A fastening element (23) can fasten the damping element (1) to a second body in order to fasten the first (12) and the second bodies to one another in a vibration-damped manner.

11 Claims, 6 Drawing Sheets

(51) Int. Cl.
 *F16B 5/10* (2006.01)
 *F16F 1/373* (2006.01)
 *F16F 1/376* (2006.01)
 *F16F 1/377* (2006.01)

(56) References Cited

U.S. PATENT DOCUMENTS

| | | | | |
|---|---|---|---|---|
| 4,306,708 | A | * | 12/1981 | Gassaway ................ F24F 1/10 |
| | | | | 248/635 |
| 4,430,776 | A | | 2/1984 | Shimizu et al. |
| 4,532,672 | A | * | 8/1985 | Anderson ................ E05F 5/06 |
| | | | | 16/86 A |
| 5,020,951 | A | | 6/1991 | Smith |
| 5,310,276 | A | * | 5/1994 | Bergers ................ F16F 7/00 |
| | | | | 403/348 |
| 5,544,714 | A | * | 8/1996 | May ................ B60K 11/04 |
| | | | | 292/251 |
| 2002/0098063 | A1 | * | 7/2002 | Pinzl ................ F16B 5/0233 |
| | | | | 411/544 |
| 2003/0002919 | A1 | | 1/2003 | Morita |
| 2004/0130082 | A1 | | 7/2004 | Tsai et al. |
| 2011/0033259 | A1 | | 2/2011 | Zhou |
| 2015/0369269 | A1 | * | 12/2015 | Holt ................ F16B 5/0241 |
| 2016/0108950 | A1 | * | 4/2016 | Steffenfauseweh ... F16B 21/075 |
| | | | | 29/451 |
| 2018/0038405 | A1 | * | 2/2018 | Clark ................ F16B 5/0241 |
| 2018/0180074 | A1 | * | 6/2018 | Benthaus ................ F16B 5/0657 |
| 2019/0242418 | A1 | * | 8/2019 | Clark ................ F16B 5/0258 |
| 2019/0248348 | A1 | * | 8/2019 | Ganzel ................ B60T 13/745 |
| 2021/0324932 | A1 | * | 10/2021 | Vippach ................ F16F 1/3732 |

FOREIGN PATENT DOCUMENTS

| | | |
|---|---|---|
| DE | 102004055409 A1 | 8/2005 |
| DE | 102008057883 A1 | 5/2010 |
| DE | 102011081469 A1 | 2/2013 |
| DE | 202013005336 U1 | 7/2014 |
| FR | 3071567 A1 | 3/2019 |

* cited by examiner

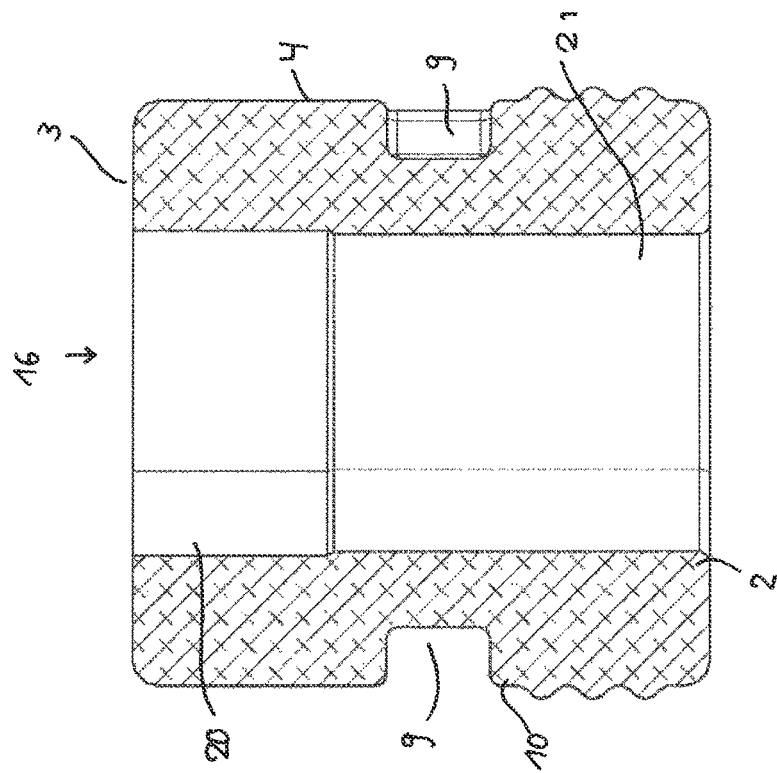
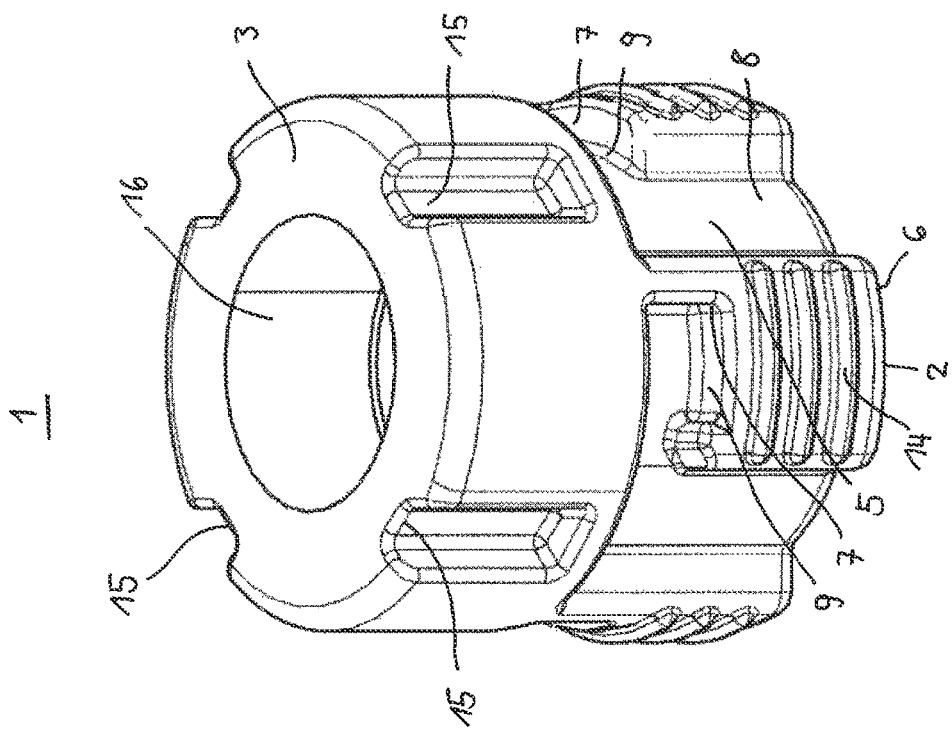
Fig. 1a
Fig. 1b

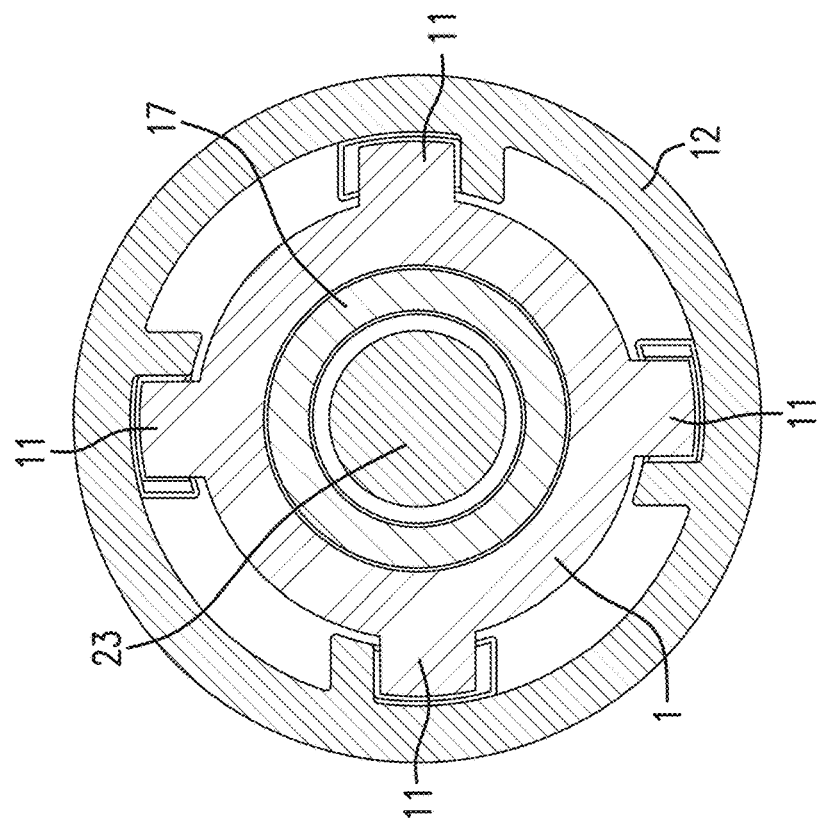
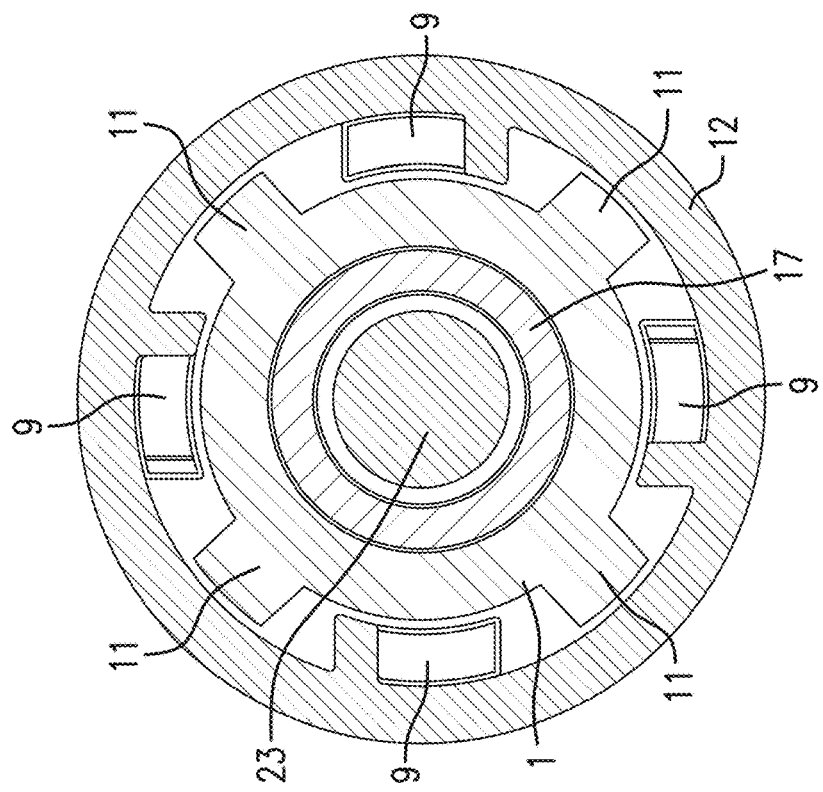

DAMPING ELEMENT HAVING BAYONET CLOSURE

FIELD OF THE INVENTION

The invention relates to a damping element which has, on its circumferential surface, a groove which is open towards an end face of the damping element. Furthermore, the invention relates to a device for vibration-damped fastening of a first body to a second body, wherein the device has a damping element. The invention further relates to a device comprising a first body and a damping element. The invention finally also relates to a device comprising a first body and a damping element, which can engage in a recess in the first body.

BACKGROUND OF THE INVENTION

DE 10048889 A1 discloses a hollow-cylindrical damping element for fastening a body to a plate using a screw. To this end, the damping element is arranged in a bush-type housing. The connection between damping element and housing is produced by complementary shaping of damping element and housing.

DE 102008057883 A1 discloses a rubber buffer for mounting an engine hood on a vehicle body component. The rubber buffer has a main body in the form of a cylindrical element with a helical groove. With the assistance of the helical groove, which acts as a screw thread, the rubber buffer can be screwed into the inner panel of the bonnet.

U.S. Pat. No. 4,430,776 describes a rubber buffer for connecting two panels. The rubber buffer has various protrusions, and resilient projections which, for the purpose of mobility, are separated from the rest of the material of the rubber buffer on two of their four sides by an L-shaped cut-out.

DE 102011081469 A1 discloses a unit fastening device for vibratory securing of an engine or transmission to a running gear. A first bearing part on the engine side and a second bearing part on the running gear side are connected together therein by a vibration-damping element which is secured in the second bearing part by a bearing cover. The bearing cover is connected to the second bearing part by a thread or by a bayonet closure.

Problem Addressed by the Invention

The problem addressed by the invention is that of providing an improved damping element which has, on its circumferential face, a groove which is open towards an end face of the damping element. The problem addressed by the invention is furthermore that of providing an improved device for vibration-damped fastening of a first body to a second body. The problem addressed by the invention is moreover that of providing an improved device comprising a first body and a damping element. The problem addressed by the invention is finally also that of providing an improved device comprising a first body and a damping element, which can engage in a recess in the first body. In particular, the invention is intended to ensure that the damping element can be fastened to the first body and separated therefrom again with little effort.

SOLUTION ACCORDING TO THE INVENTION

The reference signs in all the claims have no limiting effect, but rather are merely intended to improve the clarity thereof.

The stated problem is solved by a damping element having the features of claim 1. The damping element has, on its circumferential surface, a groove which is open towards an end face of the damping element, wherein a first portion of the groove open towards the end face of the damping element runs substantially in the longitudinal direction of the damping element.

To describe the position and geometry of the damping element, two opposing sides of the damping element are designated "end faces" and the preferably closed surface connecting these two sides is designated "circumferential surface". The end face towards which the groove is open is designated "first end face", while the opposing end face is designated "second end face". The circumferential surface is preferably a cylindrical, particularly preferably circular cylindrical, surface. The "longitudinal direction" of the damping element is the direction of an axis which runs through the centroids of the two end faces. The preferred groove has a "first" and a "second end". Hereinafter, the end of the groove open towards the end face is designated the "first end" of the groove. "Substantially in the longitudinal direction" means that the groove or the portion of the groove forms an angle of less than 45° with the longitudinal direction. The groove or the portion of the groove preferably runs in the longitudinal direction of the damping element.

Because the groove is open towards an end face of the damping element, a projection in the recess in the first body can enter into the groove in the direction of the longitudinal extent of the groove. A "projection" for the purposes of the present invention may for example be a cam or a ridge. Because the groove runs substantially in the longitudinal direction of the damping element, the damping element can be readily and rapidly inserted into the recess in the first body, as no significant rotational movement has be performed on insertion. It is feasible for damping element and first body to be insertable into one another in the manner of a bayonet closure.

The problem of the invention is furthermore solved by a damping element which has at least two grooves on its circumferential surface, which grooves are open towards an end face of the damping element. In this way, the damping element may advantageously be fastened particularly securely to the first body.

The stated problem is moreover solved by a damping element having the features of claim 3. The damping element has, on its circumferential surface, a groove open towards an end face of the damping element, wherein the groove has a narrow point.

A "narrow point" is a portion of a groove which is narrower than both a portion of the groove directly preceding the narrow point and a portion directly following the narrow point. The narrow point ensures that a projection which engages in the groove has to overcome the narrow point in order to pass from one side of the narrow point to the other. The narrow point makes it more difficult to detach the damping element from the recess in the first body when the projection is located on the portion of the groove remote from the first end of the groove.

The stated problem is moreover solved by a device having the features of claim 11. The device may fasten a first body to a second body in vibration-damped manner by means of the damping element.

The device comprises a first body and the damping element.

The device comprises a first body and a damping element, which can engage in a recess in the first body. The recess in the first body has a groove open towards an end face of the first body, and the damping element has a projection which can enter into the groove when the damping element engages in the recess of the first body. The "end face" of the first body is the face from which the damping element can be inserted into the recess in the first body. It is feasible for damping element and first body to be insertable into one another in the manner of a bayonet closure.

The first body may for example be a pump, for example a vacuum, oil or coolant pump, for example a cooling water pump, in particular the housing of such a pump, for an engine, in particular an internal combustion engine. The second body may be the engine itself, in particular the engine block thereof. The pump unit may also be adapted to other components, the solution thus not being limited to connection to an internal combustion engine.

PREFERRED EMBODIMENTS OF THE INVENTION

Advantageous developments and further developments, which may be used individually or in combination, constitute the subject matter of the dependent claims and the following description.

The preferred damping element comprises, particularly preferably consists of, a rubber-elastic material, preferably an elastomer, for example hydrogenated acrylonitrile butadiene rubber (HNBR) or ethylene propylene diene rubbers (EPDM).

The preferred damping element or the preferred first body has, on the circumferential surface thereof, at least two, preferably three or four, grooves which are open towards the same end face of the damping element or of the first body. The grooves preferably run parallel to one another. The grooves are preferably of identical configuration. The grooves are preferably uniformly spaced from one another on the circumferential surface of the damping element. The grooves are particularly preferably arranged rotationally symmetrically, particularly preferably n-fold rotationally symmetrically, relative to the longitudinal axis of the damping element wherein n is the number of grooves. In other embodiments, the damping element has just one groove.

The groove(s) or at least the first portion of the groove(s) open towards the end face of the damping element or of the first body preferably forms or form with the longitudinal direction an angle of less than 45°, particularly preferably less than 30°, particularly preferably less than 15° and particularly preferably less than 5°. The groove(s) or the portion of the groove(s) open towards the end face runs or run in the longitudinal direction of the damping element or of the recess of the first body.

The "longitudinal direction" of the first body is the direction in which the damping element can be inserted into the recess. The longitudinal direction of the first body preferably runs perpendicular to the end face of the first body. The preferred recess in the first body is a substantially cylindrical, particularly preferably circular cylindrical, hole and particularly preferably a through-hole.

The preferred groove(s) of the damping element or of the first body has or have a narrow point. The narrow point ensures that a projection of the first body or of the damping element has to overcome the narrow point in order to pass from one side of the narrow point to the other. The second end of the groove(s) is preferably closed, i.e. not open towards an end face of the damping element or of the first body. This ensures that a projection cannot exit the groove through the second end and the damping element thus cannot become detached from the recess.

The groove(s) of the damping element or of the first body preferably has or have a second portion which runs substantially in the circumferential direction of the damping element or the first body. The "circumferential direction" is a direction which forms a right angle with the longitudinal direction of the damping element or of the first body. "Substantially in the circumferential direction" means that the second portion of the first groove forms an angle with the circumferential direction of less than 40°, particularly preferably less than 25°, particularly preferably less than 15° and particularly preferably less than 5°. A particularly preferred second portion runs in the circumferential direction of the damping element or of the first body.

The second portion of the groove(s) preferably includes the closed end of the respective groove. The narrow point preferably lies between the first and the second groove portion. In this way, a projection engaging in the groove can be secured into the second portion of the groove, between the narrow point and the closed end. The second portion is preferably of precisely the right size for the projection to fit therein.

A preferred damping element has a handling portion. In the handling portion, at least one or a plurality of depression(s), projection(s) or through-hole(s) are preferably arranged on the circumferential face of the damping element, preferably spaced uniformly in the circumferential direction in the case of a plurality. The preferred handling portion projects beyond the recess in the first body, when the damping element is fastened in the recess. This enables a fitter to grasp the handling portion with their hand or with a tool, in order to rotate the damping element about its longitudinal direction relative to the first body. As a result of this rotation, the projection can be moved beyond the narrow point in order to secure the damping element to the first body or detach it therefrom. The handling portion is preferably located between the groove(s) and the second end face of the damping element.

The damping element is preferably annular. "Annular" means that the damping element has a hole which extends from the first end face through the damping element to the second end face. The preferred hole is at least in places cylindrical and particularly preferably circular cylindrical. At least in places, the preferred damping element is a hollow cylinder and particularly preferably a circular hollow cylinder.

A bush is preferably arranged in the hole in the damping element. The bush is preferably of metal, for example steel, and particularly preferably of sheet steel, or of plastics. The preferred bush spans more than the half of the longitudinal extent of the hole, i.e. the distance from the one end to the other hand end of the hole, particularly preferably spanning at least 70% and particularly preferably at least 90% of the hole. However, it preferably does not span the entire hole. The advantage of this is that the damping element can be compressed in its longitudinal direction without the bush thereby exiting the damping element at an end face, in particular the second end face.

The circumferential surface of the bush preferably adjoins in places or in full the circumferential surface of the hole in the damping element. Damping element and bush are preferably connected interlockingly together. In this way, it may be ensured that the bush is secured in the damping element, in order to prevent the bush from slipping out of the damping element. In one embodiment of the invention, the hole in the damping element to this end has at least two portions with different hole diameters. The preferred bush has at least two corresponding portions of different external diameters, wherein a portion of the bush of smaller external diameter adjoins a portion of the hole of smaller hole diameter and a portion of the bush of larger external diameter adjoins a portion of the hole in the damping element of greater hole diameter. The bush preferably has a radially outwardly extending protrusion at one end face of the damping element, which protrusion particularly preferably adjoins the end face of the damping element. This protrusion may contribute to securing the bush and the damping element together in interlocked manner. In some embodiments of the invention, the damping element with inserted bush is vulcanized or the damping element is adhesively bonded to the bush.

The preferred device for vibration-damped fastening of a first body to a second body has a fastening element in addition to the damping element. The preferred fastening element can engage in the hole in the damping element and in a recess in the second body in order to connect them. The bush is preferably arranged between the fastening element and the damping element.

The preferred second body has a recess into which the fastening element engages at least in places. The preferred recess is a substantially cylindrical, and particularly preferably circular cylindrical, hole. The hole may be a blind hole, i.e. a hole closed at one end, or a through-hole. The recesses in the first body and the second body are preferably coaxially aligned or at least overlap one another.

In one preferred embodiment of the invention, the fastening element spans the hole in the damping element, i.e. it extends through the entire longitudinal extent of the hole from one end face of the damping element to the other end face of the damping element. The fastening element is preferably arranged captively in the bush. The preferred bush has a constriction on the inside thereof, particularly preferably at one end of the bush. The fastening element preferably has two portions in each case with a diameter which is of such a size that it cannot overcome the constriction of the bush, wherein these portions of the screw are arranged at opposing sides of the constriction of the bush. One portion of enlarged diameter is preferably formed by a head of the fastening element. A second portion of enlarged diameter is preferably located in the region of a shank of the fastening portion and is hereinafter designated "securing portion". The constriction of the bush is preferably located at the end of the bush facing the head of the fastening element.

The preferred fastening element has a head with a chin. The diameter of the chin is preferably greater than the diameter of the hole in the damping element, such that the head of the fastening element cannot enter the hole. In this way, the damping element or the combination of the damping element and the bush can advantageously be secured between the chin and the end face of the second body. The preferred chin has a diameter of such a size that it can act on the second end face of the damping element in order to compress the damping element.

The preferred fastening element is a screw. A screw for the purposes of the present invention has a head and a shank, wherein the shank has a thread at least in places and particularly preferably at least at the end at which the head is not located.

The preferred groove(s) of the damping element are open towards the end face of the damping element which is opposite the end face closest to the head of the fastening element. In this way, the device can be inserted into the recess in the first body with the end face of the damping element remote from the head first, wherein a projection in the recess of the first body enters the groove in the direction of the longitudinal extent of the groove. The thread of the fastening device is preferably located at the end of the securing portion remote from the head.

The recess in the second body is preferably provided with a mating thread corresponding to the thread of the fastening element, such that the device can be fastened by screws to the second body.

BRIEF DESCRIPTION OF THE DRAWINGS

Further advantageous configurations are described in greater detail below with reference to multiple exemplary embodiments illustrated schematically in the drawings, to which the invention is however not limited and in which:

FIG. 1 shows a damping element according to the invention in (a) perspective view and (b) cross-sectional view;

FIGS. 6a-6b are cross-sectional views of the device in (a) locked and (b) unlocked position of an embodiment where grooves and projections are reversed in such a way that the grooves are located on the first body and the projections are located on the damping element.

DETAILED DESCRIPTION OF EMBODIMENTS OF THE INVENTION

In the description given below of preferred embodiments of the present invention, the same reference signs denote the same or comparable components.

Figure 5B:
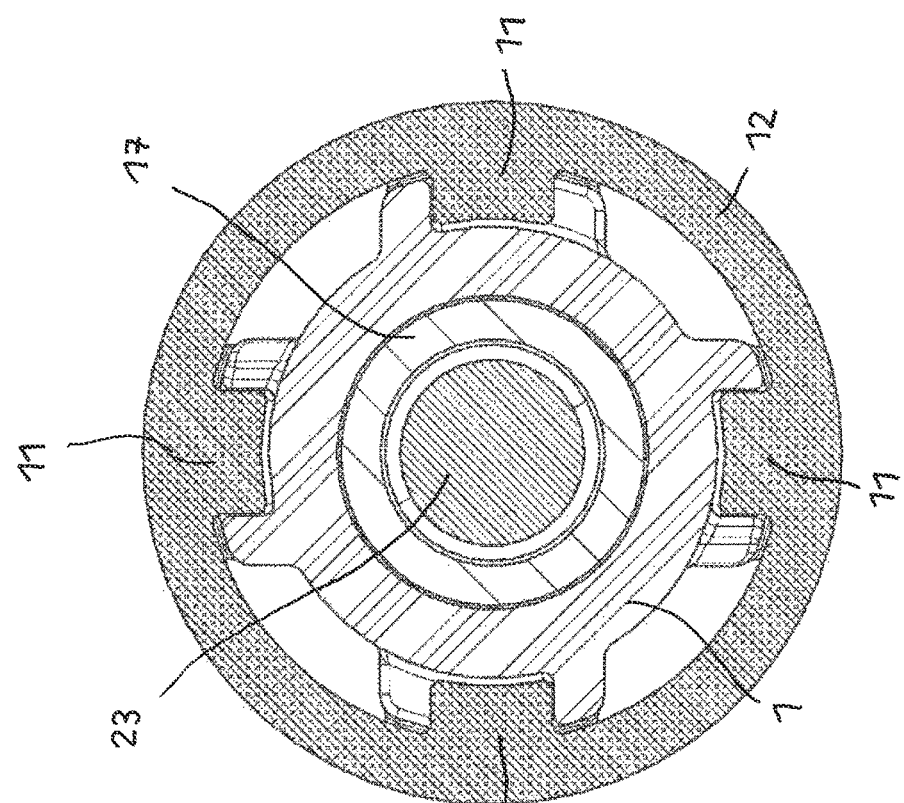
FIGS. 5a-5b are cross-sectional views of the device of FIGS. 2 and 3 with damping element inserted into the first body in (a) unlocked and (b) locked position.

A damping element 1 according to the invention has, as may best be seen in FIGS. 1a and 1b, an annular, to be precise hollow-cylindrical, shape, wherein the first 2 and the second 3 end faces are connected by a circumferential surface 4 of the damping element 1. In the circumferential surface 4, four grooves 5 are located, whose first ends 6 are open towards the first end face 2 and whose second ends 7 are closed. The grooves 5 are identical to one another and, as is readily visible in FIGS. 5a and 5b, spaced uniformly from one another.

Figure 4B:
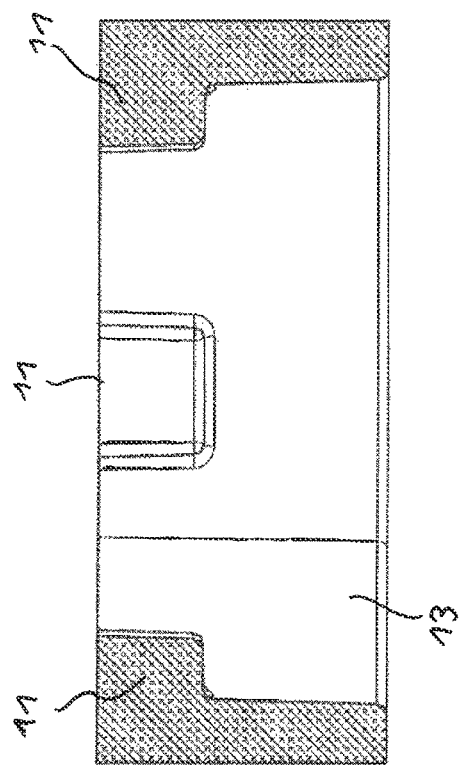
FIG. 4 shows the recess in the first body in (a) a first cross-sectional view perpendicular to the longitudinal direction of the recess and (b) along the section line A-A shown in (a)
Figure 4A:
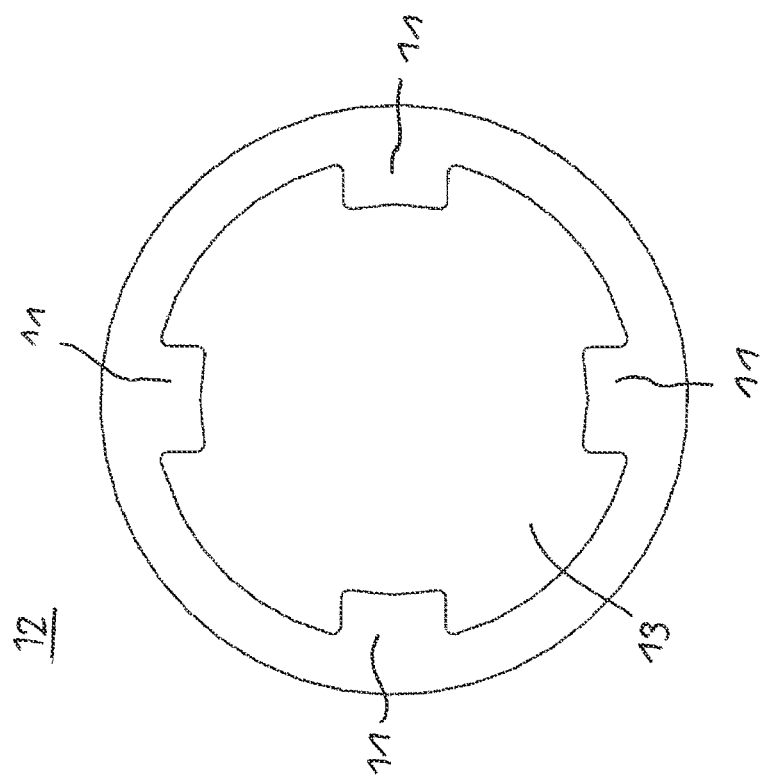

Each groove 5 has, as may best be seen in FIGS. 1a and 1b, a first portion 8 in the manner of the groove of a bayonet closure, said portion 8 comprising the open end 6 of the groove, and a second portion 9 comprising the closed end 7 of the groove. The first portion 8 runs in the longitudinal direction of the damping element 1, the second portion in the circumferential direction of the damping element 1. A narrow point 10 is located between the two portions 8 and 9. In the longitudinal direction of the damping element 1, the height of the narrow point 10 (see FIG. 1b) is less than that of a projection 11 in a recess 13 in a first body 12 (see FIG. 4b), which can engage in the groove 5 in order to secure the damping element 1 in the recess 13 in the first body 12. In this way, the projection 11 has to overcome the narrow point 10 contrary to the resilient force of the damping element 1 in the region of the narrow point 10, in order to pass from the first 8 into the second portion 9 of the groove 5. The second portion 9 of the groove 5 is precisely as wide and high as is needed to accommodate the projection 11.

Figure 5A:
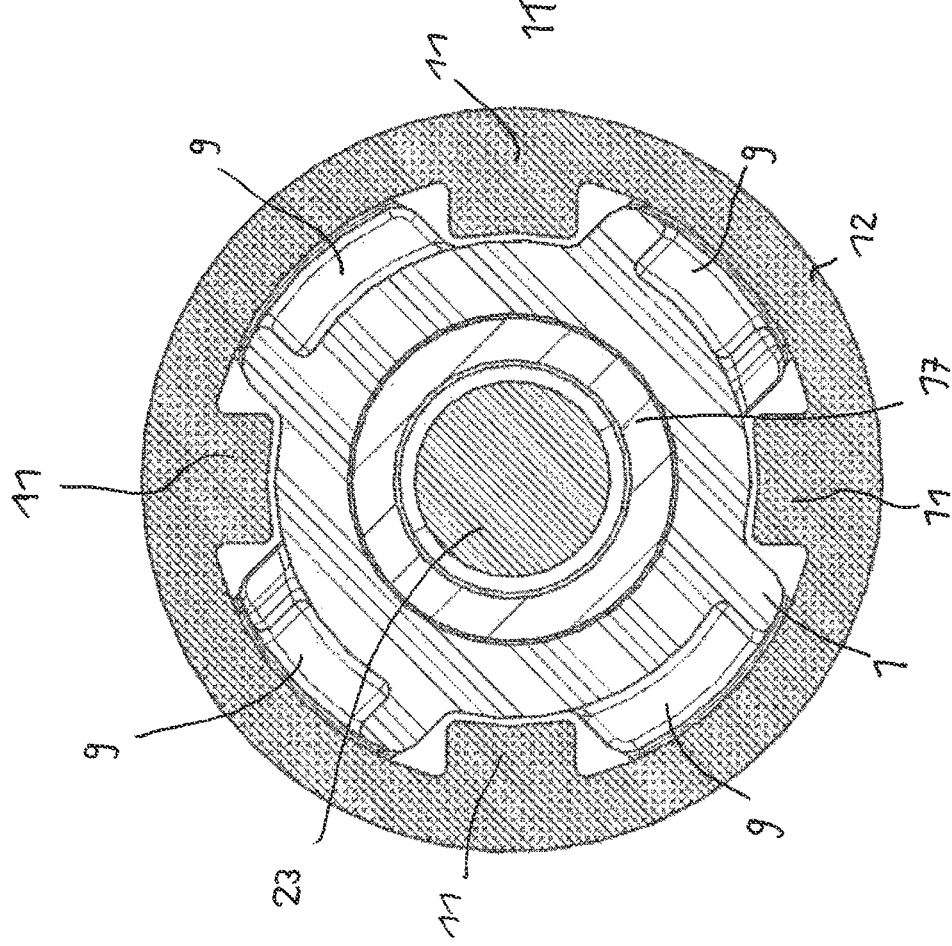

In order to fasten the damping element 1 in the recess 13 in the first body 12, it is first of all inserted in the longitudinal direction into the recess 13, wherein the projections 11 pass through the open ends of the grooves 5 into the first portions 8 of the grooves 5, as shown in FIG. 5*a*. Then the projections 11 are moved by turning the damping element 1 about the longitudinal direction thereof against the resilient force of the damping element 1 in the region of the narrow point 10 beyond the narrow points 10 into the second portion 9 of the groove 5, so as to come to lie there. This position is visible in FIG. 5*b*. In the region of the first portion 8 of the grooves 5, the damping element 1 has circumferentially extending ribs 14 which pretension the damping element resiliently against the inner surface of the recess 13 in the first body 12 and thus ensure, jointly with projection 11 and second groove portion 9, that the damping element 1 sits firmly in the recess 13 in the first body 12. The recess 13 in the first body 12 is a circular cylindrical through-hole. The first body 12 is a coolant pump and in the figures is shown symbolically as a ring about its recess 13 solely for the purpose of simplification.

The damping element has a handling portion with four uniformly spaced depressions 15 on the circumferential face of the damping element. In another exemplary embodiment not shown in the figures, the handling element has just one depression. The handling portion is located between the grooves 5 and the second end face 3 of the damping element 1 and still projects, as is readily apparent in FIGS. 2*a*, 2*b*, 3*a* and 3*b*, beyond the recess 13 in the first body 12 even when the damping element 1 has been secured in the recess 13. In this way, a fitter can grasp the handling portion with their hand or with a tool in order to rotate the damping element 1 about its longitudinal direction relative to the first body 12 and in this way fasten it to the first body 12 or detach it therefrom.

A hole 16 in the damping element 1 extends from the first 2 to the second end face 3 of the damping element 1. In the hole 16 is arranged a bush 17 which spans the hole from the first end face 2 to shortly before the second end face 3. In this way, the damping element 1, as is easily visible in FIG. 3*b*, may be compressed in its longitudinal direction, without the bush 17 thereby exiting from the damping element 1 at an end face 2, 3, in particular the second end face 3. To secure the bush 17 in the damping element 1, it has an upper portion 18 with a somewhat larger external diameter than that of a lower portion 19, and the hole 16 in the damping element has a corresponding upper portion 20 with a somewhat larger internal diameter than that of a lower portion 21. Moreover, at the first end face 2 of the damping element 1, the bush 17 has a radially outwardly extending protrusion 22, which adjoins the first end face 2 of the damping element 1.

Figure 2B:
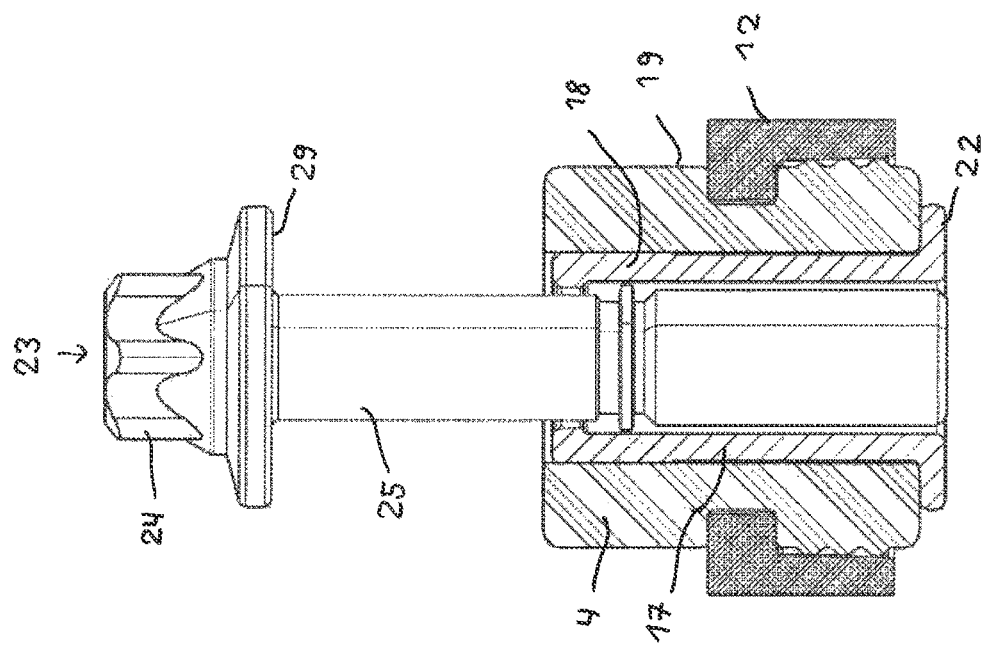
FIG. 2 shows a device according to the invention comprising damping element, first body, bush and fastening element in transport position in (a) perspective view and (b) cross-sectional view.
Figure 2A:
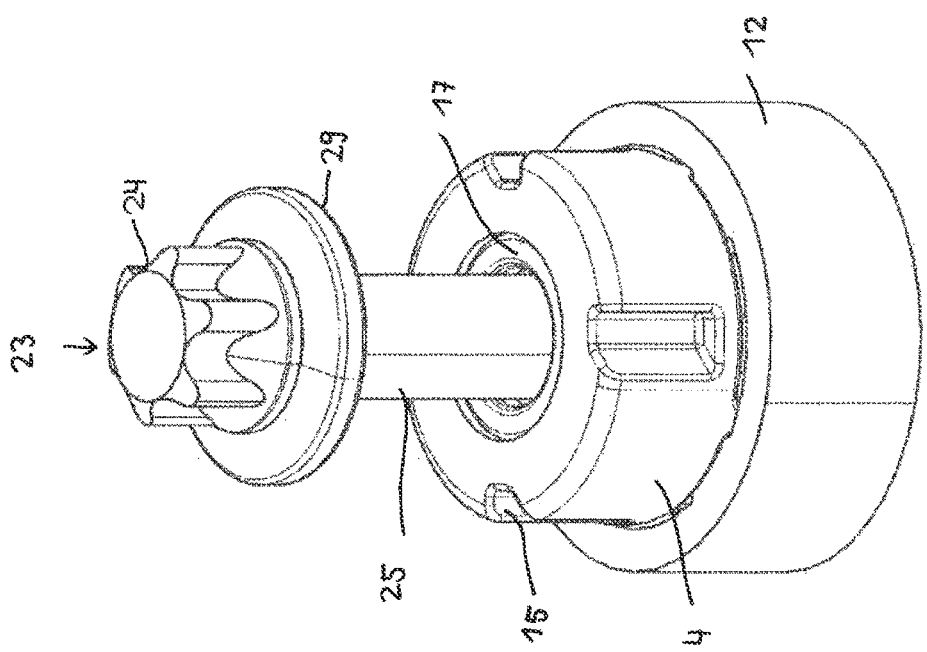

A screw 23 with a head 24 and a shank 25 engages as fastening element in the hole in the bush 17 and is preferably arranged captively in the bush 17. To this end, the bush 17 has an internal constriction 26 at the end pointing towards the second end face 3 of the damping element 1. The screw has an annular securing portion 27 on its shank 25, with a diameter which is of such a size that it cannot overcome the constriction 26 of the bush 17. The head 24 of the screw 23 also has a greater diameter than the constriction 26. Because the constriction 26 is located directly between head 24 and securing portion 27, the screw 23 is prevented from falling out of the damping element 1. The device comprising damping element 1, first body 12, bush 17 and captive screw 23 is shown in FIGS. 2*a* and 2*b*. The damping element 1 is secured in the recess 13 in the first body 12. The first body 12 with attached damping element 1 and screw 23 can be transported and delivered in this way for fitting to a second body (not shown), in particular an internal combustion engine.

Figure 3B:
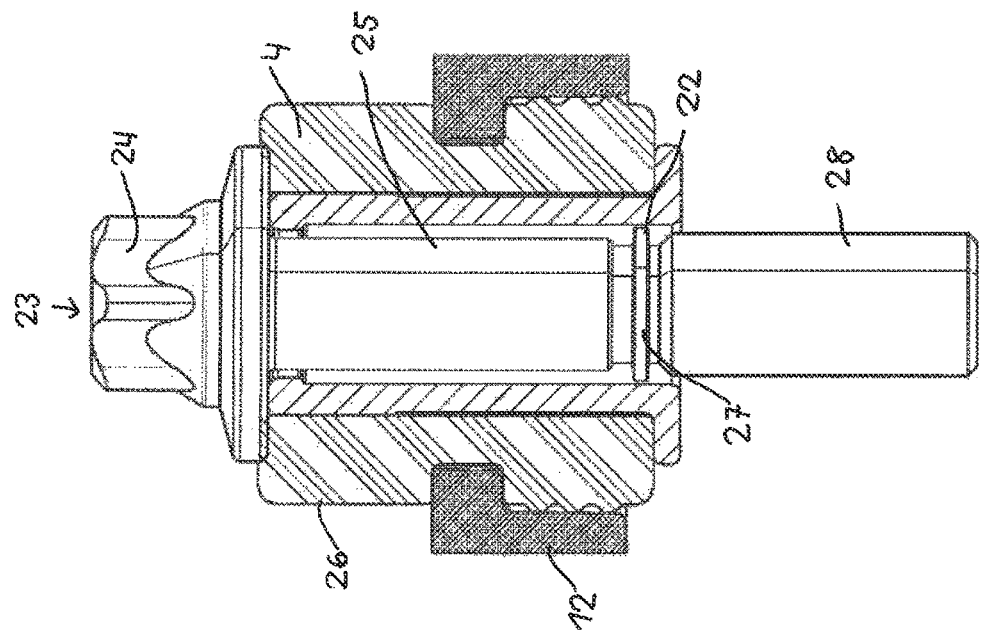
FIG. 3 shows a device according to the invention comprising damping element, first body, bush and fastening element in fastening position in (a) perspective view and (b) cross-sectional view.
Figure 3A:
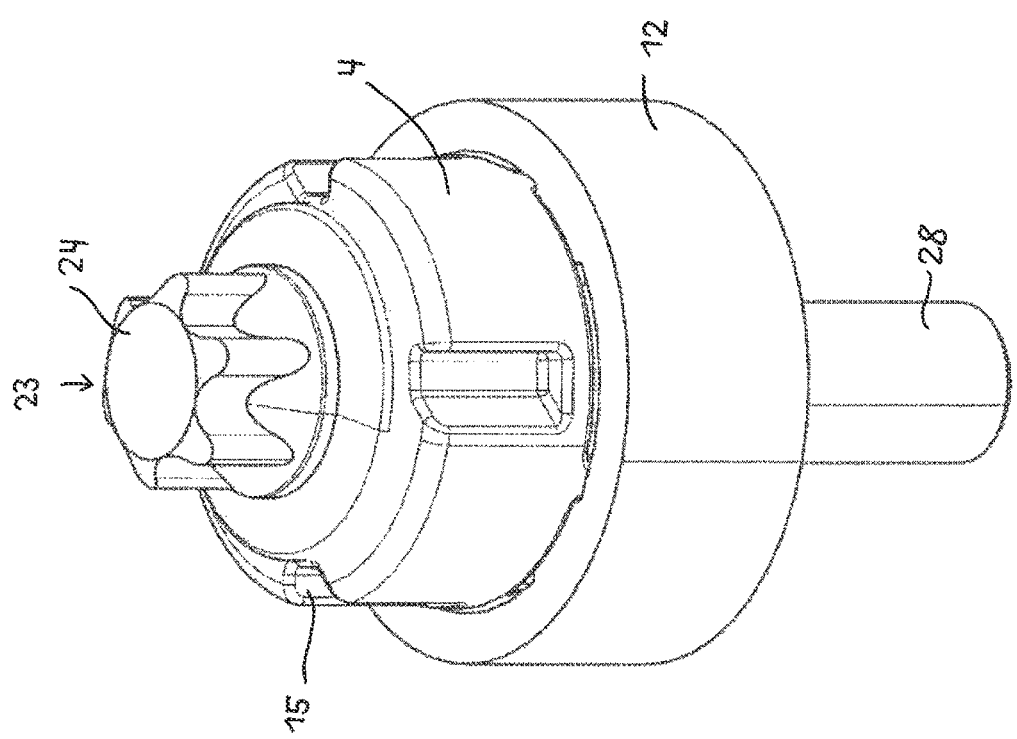

At its end remote from the head 24, on the other side of the securing portion, the shank 25 of the screw 23 has a thread 28, with which it can engage in a recess in the second body. The recess in the second body is a blind or through-hole and is provided for this purpose with a corresponding internal thread. The fastening position with screw 23 screwed into the recess in the second body is shown in FIGS. 3*a* and 3*b*. The head 24 of the screw 23 has a chin 29, the diameter of which is of a size such it can act on the second end face 3 of the damping element 1, in order to compress the damping element 1.

In one variant of the above-described damping element 1 and of the above-described first body 12, grooves 5 and projections 11 are reversed in such a way that the grooves 5 are located on the first body 12 and the projections 11 are located on the damping element 1. This variant is shown in FIGS. 6*a*-6*b*. Otherwise, the configuration and mode of operation correspond, mutatis mutandis, to that described above.

The features disclosed in the above description, the claims and the drawings may be of significance for implementation of the invention in its various embodiments either individually or in any desired combination.

The invention claimed is:

1. A damping element in combination with a first body, wherein the damping element engages with a recess in the first body and which has, on a circumferential surface, a groove which at a first end is open towards a first end face of the damping element, so that a projection in the recess of the first body runs in the groove along a longitudinal axis of the groove, and wherein the groove is closed at a second end, wherein the groove has a narrow point such that the projection, when it runs in the groove the projection is fixable between the narrow point and the closed second end in a circumferential direction of the groove in a section of the groove, wherein the damping element is annular, a sleeve is arranged in a hole of the annular damping element, and a fastening element with a head and a chin is arranged in the sleeve such that the head is on a side of a second end face of the damping element opposite the first end face, wherein the sleeve does not span the entire hole and has a radially outwardly extending protrusion at one end face of the damping element so that the damping element is compressible between the protrusion and the chin.

2. The damping element according to claim 1 wherein the section of the groove runs essentially in a circumferential direction of the damping element.

3. The damping element according to claim 1 wherein the damping element has a handling section in which at least one depression or at least one projection is arranged on a circumferential side of the damping element.

4. The damping element according to claim 3 wherein the at least one depression or the at least one projection of the handling section comprises a plurality of recesses or projections which are uniformly spaced in the circumferential direction.

5. The damping element according to claim 1 wherein the sleeve is made of metal.

6. A device for the vibration-damped fastening of the first body to a second body, wherein the device has a damping element according to claim 1.

7. The device according to claim 1 wherein the fastening element is arranged in a captive manner in the sleeve.

8. The device according to claim 6 wherein the sleeve has a constriction at one of its ends on its inner side.

9. The device according to claim 1 wherein a diameter of the head is greater than a diameter of the hole of the damping element.

10. The device according to claim 1 wherein the fastening element is a screw.

11. A device comprising a first body and an annular damping element which is insertable into a recess of the first body, wherein the recess of the first body has a groove which at a first end is open towards a first end face of the first body, and wherein the damping element has, on a circumferential surface, a projection which runs in the groove along a longitudinal axis of the groove when the damping element engages in the recess of the first body, wherein the groove is closed at a second end, and wherein the groove has a narrow point such that the projection, when it runs in the groove, the projection is fixable between the narrow point and the closed second end in a circumferential direction of the groove wherein the damping element is annular, a sleeve is arranged in a hole of the annular damping element, and a fastening element with a head and a chin is arranged in the sleeve such that the head is on a side of a second end face of the damping element opposite the first end face, wherein the sleeve does not span the entire hole and has a radially outwardly extending protrusion at one end face of the damping element so that the damping element can be compressed between the protrusion and the chin.

* * * * *